United States Patent
Lee et al.

(10) Patent No.: US 10,147,960 B2
(45) Date of Patent: Dec. 4, 2018

(54) SHUT DOWN SYSTEM AND CONTROL METHOD OF FUEL CELL VEHICLE

(71) Applicant: Hyundai Motor Company, Seoul (KR)

(72) Inventors: Kyu Il Lee, Gyeonggi-do (KR); Jae Yeong Yoo, Gyeonggi-Do (KR); Sung Suk Ok, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 90 days.

(21) Appl. No.: 15/378,755

(22) Filed: Dec. 14, 2016

(65) Prior Publication Data

US 2018/0069254 A1    Mar. 8, 2018

(30) Foreign Application Priority Data

Sep. 5, 2016   (KR) .................. 10-2016-0114053

(51) Int. Cl.

| | |
|---|---|
| *H01M 8/04858* | (2016.01) |
| *H01M 16/00* | (2006.01) |
| *H01M 8/04303* | (2016.01) |
| *H01M 8/04955* | (2016.01) |
| *H01M 8/04992* | (2016.01) |
| *B60L 11/18* | (2006.01) |
| *H01M 8/04302* | (2016.01) |

(52) U.S. Cl.
CPC ..... *H01M 8/04873* (2013.01); *B60L 11/1812* (2013.01); *B60L 11/1887* (2013.01); *H01M 8/04302* (2016.02); *H01M 8/04303* (2016.02); *H01M 8/04955* (2013.01); *H01M 8/04992* (2013.01); *H01M 16/003* (2013.01); *H01M 16/006* (2013.01); *B60L 2240/527* (2013.01); *B60Y 2200/11* (2013.01); *B60Y 2200/143* (2013.01); *B60Y 2200/50* (2013.01); *B60Y 2200/91* (2013.01); *B60Y 2200/92* (2013.01); *H01M 2250/20* (2013.01)

(58) Field of Classification Search
CPC .................................. B60L 11/00; H01M 8/04
USPC ........................................................ 429/13
See application file for complete search history.

(56) References Cited

U.S. PATENT DOCUMENTS

| | | | |
|---|---|---|---|
| 8,956,774 B2* | 2/2015 | Kwon ............... | H01M 8/04253 429/413 |
| 9,242,575 B2* | 1/2016 | Kim .................... | B60L 11/1887 |

(Continued)

FOREIGN PATENT DOCUMENTS

| | | |
|---|---|---|
| KR | 10-2009-0062332 | 6/2009 |
| KR | 10-2009-0062397 | 6/2009 |

(Continued)

*Primary Examiner* — Abdullah Riyami
*Assistant Examiner* — Nader Alhawamdeh
(74) *Attorney, Agent, or Firm* — Mintz Levin Cohn Ferris Glovsky and Popeo, P.C.; Peter F. Corless

(57) ABSTRACT

A shut down system of a fuel cell vehicle includes: a fuel cell configured to output a high voltage; a rechargeable high voltage battery; a bidirectional converter arranged between an output terminal of the fuel cell and the high voltage battery; a first relay arranged between the fuel cell and the bidirectional converter; and a controller configured to control a voltage of the bidirectional converter when the fuel cell vehicle stalls to reduce a voltage of the output terminal of the fuel cell and turn off the first relay when a voltage value of the output terminal of the fuel cell is below a preset voltage reference value.

15 Claims, 2 Drawing Sheets

(56) References Cited

U.S. PATENT DOCUMENTS

| | | | | |
|---|---|---|---|---|
| 9,299,998 B2* | 3/2016 | Chun | ................ | H01M 8/04231 |
| 2010/0009219 A1* | 1/2010 | Kwon | ................ | B60L 11/1887 |
| | | | | 429/432 |
| 2012/0141895 A1* | 6/2012 | Kwon | ............... | H01M 8/04037 |
| | | | | 429/429 |
| 2016/0006059 A1* | 1/2016 | Kwon | ................ | B60L 11/1892 |
| | | | | 429/434 |
| 2018/0069254 A1* | 3/2018 | Lee | ................... | H01M 8/04873 |

FOREIGN PATENT DOCUMENTS

| | | |
|---|---|---|
| KR | 10-2009-0111241 | 10/2009 |
| KR | 10-2016-0055288 A | 5/2016 |
| WO | 2014/109761 A1 | 7/2014 |

* cited by examiner

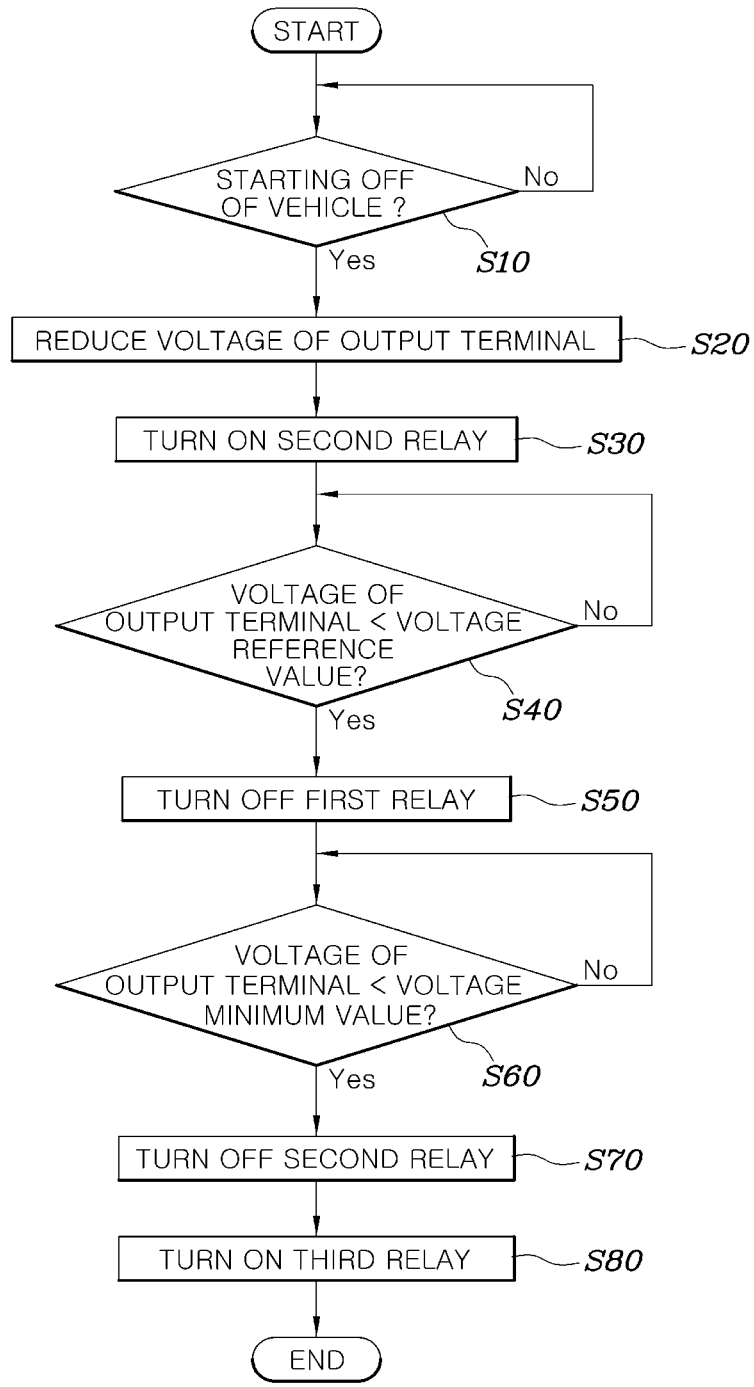

SHUT DOWN SYSTEM AND CONTROL METHOD OF FUEL CELL VEHICLE

CROSS REFERENCE TO RELATED APPLICATION

The present application claims under 35 U.S.C. § 119(a) the benefit of Korean Patent Application No. 10-2016-0114053, filed on Sep. 5, 2016, the entire contents of which is incorporated herein for all purposes by this reference.

BACKGROUND

1. Technical Field

The present disclosure relates to a shut down system and a control method of a fuel cell vehicle capable of improving fuel efficiency of the fuel cell vehicle while preventing a fuel cell from deteriorating at the time of a shut down of the fuel cell vehicle.

2. Description of the Related Art

A fuel cell is a type of power generating device that does not convert chemical energy of a fuel into heat by combustion, but instead converts the chemical energy into electrical energy by an electrochemical reaction in a fuel cell stack and may be used to supply power to a small electric or electron product, particularly, a portable apparatus as well as supply industrial power, household power, and power for driving a vehicle.

The fuel cell that has been mainly used for vehicles is a polymer electrolyte membrane fuel cell (PEMFC) and has advantages of high efficiency, a large current density and output density, a short staffing time, and fast response characteristics to a load change, compared to other types of fuel cells. To use the fuel cell as a power source of the vehicle, the fuel cell configured by stacking unit cells of the fuel cell to obtain required power and various kinds of operation apparatuses are configured in a system to be mounted in a vehicle.

An example of the operation apparatus for the fuel cell may include a hydrogen supply apparatus supplying hydrogen that is fuel of the fuel cell, an air supply apparatus supplying air including an oxidizer, i.e., oxygen to the fuel cell, and a heat and water management system emitting heat, which is an electrochemical reaction byproduct of the fuel cell, to the outside to control an operating temperature of the fuel cell to be optimal and performing a water management function.

The hydrogen supply apparatus includes a hydrogen tank, a hydrogen supply valve, a pressure controller, a hydrogen recirculation apparatus, or the like, the air supply apparatus includes an air supplier, an air valve, a humidifier, or the like, and the heat and water management system includes a coolant pump, a radiator, a 3-way valve, a water discharge apparatus for discharging water in a stack, or the like. In addition, the operation apparatus may include a hydrogen purge valve of a hydrogen exhaust line for removing impurities in an anode, a cathode oxygen removing resistance for removing a stack voltage, or the like.

In the cathode oxygen removing resistance, when the driving of the fuel cell vehicle is finished and then the fuel cell vehicle stalls to shut down the fuel cell system, if the fuel cell voltage is equal to or more than a predetermined voltage and hydrogen remains in the anode and hydrogen remains in the cathode, hydrogen and oxygen are exchanged with each other by an electrolyte membrane to accelerate a deterioration of a catalyst layer.

Therefore, it is essential to remove the oxygen and the hydrogen from the cathode and the anode while reducing the fuel cell voltage when the fuel cell system shuts down. For this purpose, the cathode oxygen removing resistance is provided. However, aside from the reduction in the fuel cell voltage by the foregoing, the fuel cell voltage is forcibly reduced by the oxygen removing resistance and thus the efficiency of the fuel cell vehicle is reduced, thereby reducing the fuel efficiency.

The matters described as the related art have been provided only for assisting in the understanding for the background of the present disclosure and should not be considered as corresponding to the related art known to those skilled in the art.

SUMMARY

An object of the present disclosure is to provide a shut down system of a fuel cell vehicle and a control method of the fuel cell vehicle capable of preventing a fuel cell from deteriorating by reducing a voltage of an output terminal of the fuel cell and improving fuel efficiency of the fuel cell vehicle by charging a high voltage battery with the voltage of the output terminal of the fuel cell, when the fuel cell vehicle stalls.

According to an exemplary embodiment of the present disclosure, there is provided a shut down system of a fuel cell vehicle, including: a fuel cell configured to output a high voltage; a rechargeable high voltage battery; a bidirectional converter arranged between an output terminal of the fuel cell and the high voltage battery; a first relay arranged between the fuel cell and the bidirectional converter; and a controller configured to control a voltage of the bidirectional converter when the fuel cell vehicle stalls to reduce a voltage of the output terminal of the fuel cell and turn off the first relay when a voltage value of the output terminal of the fuel cell is below a preset voltage reference value.

The shut down system may further include: a resistor part configured to consume the voltage of the output terminal of the fuel cell; and a second relay arranged between the fuel cell and the resistor part, in which the controller may turn on the second relay when the fuel cell vehicle stalls to allow the resistor part to consume the voltage of the output terminal of the fuel cell.

The controller may turn off the second relay when the voltage value of the output terminal of the fuel cell is below a preset voltage minimum value.

The controller may turn off the first relay when a preset reference time lapses after turning on the second relay.

The controller may turn off the first relay when chargeable power of the high voltage battery based on the voltage of the output terminal of the fuel cell is below a preset power reference value.

The controller may control a voltage of the bidirectional converter so that the voltage of the output terminal of the fuel cell is reduced to a preset rate of change.

According to another exemplary embodiment of the present disclosure, there is provided a shut down control method of a fuel cell vehicle, including: controlling, by a controller, a voltage of a bidirectional converter provided between a fuel cell and a high voltage battery when the fuel cell vehicle stalls to reduce a voltage of an output terminal of the fuel cell; and turning off, by the controller, a first relay provided between the fuel cell and the bidirectional converter when the voltage of the output terminal of the fuel cell is below a preset voltage reference value.

The shut down control method may further include: turning on, by the controller, a second relay provided between a resistor part provided to consume the voltage of the output terminal of the fuel cell and the fuel cell when the vehicle stalls.

The shut down control method may further include: turning off, by the controller, the second relay when the voltage of the output terminal of the fuel cell is below a preset voltage minimum value.

The shut down control method may further include: turning off, by the controller, the first relay when a preset reference time lapses after turning on the second relay.

The shut down control method may further include: turning off, by the controller, the first relay when chargeable power of the high voltage battery based on the voltage of the output terminal of the fuel cell is below a preset power reference value.

The controller may control the voltage of the bidirectional converter so that the voltage of the output terminal of the fuel cell is reduced to a preset rate of change.

According to a further exemplary embodiment of the present disclosure, there is provided a non-transitory computer readable medium containing program instructions executed by a processor, the computer readable medium including: program instructions that control a voltage of a bidirectional converter provided between a fuel cell and a high voltage battery when a fuel cell vehicle stalls to reduce a voltage of an output terminal of the fuel cell; and program instructions that turn off a first relay provided between the fuel cell and the bidirectional converter when the voltage of the output terminal of the fuel cell is below a preset voltage reference value.

BRIEF DESCRIPTION OF THE DRAWINGS

FIG. 2 is a flow chart of a shut down control method of a fuel cell vehicle according to the exemplary embodiment of the present disclosure.

DESCRIPTION OF THE EXEMPLARY EMBODIMENTS

Figure 1:
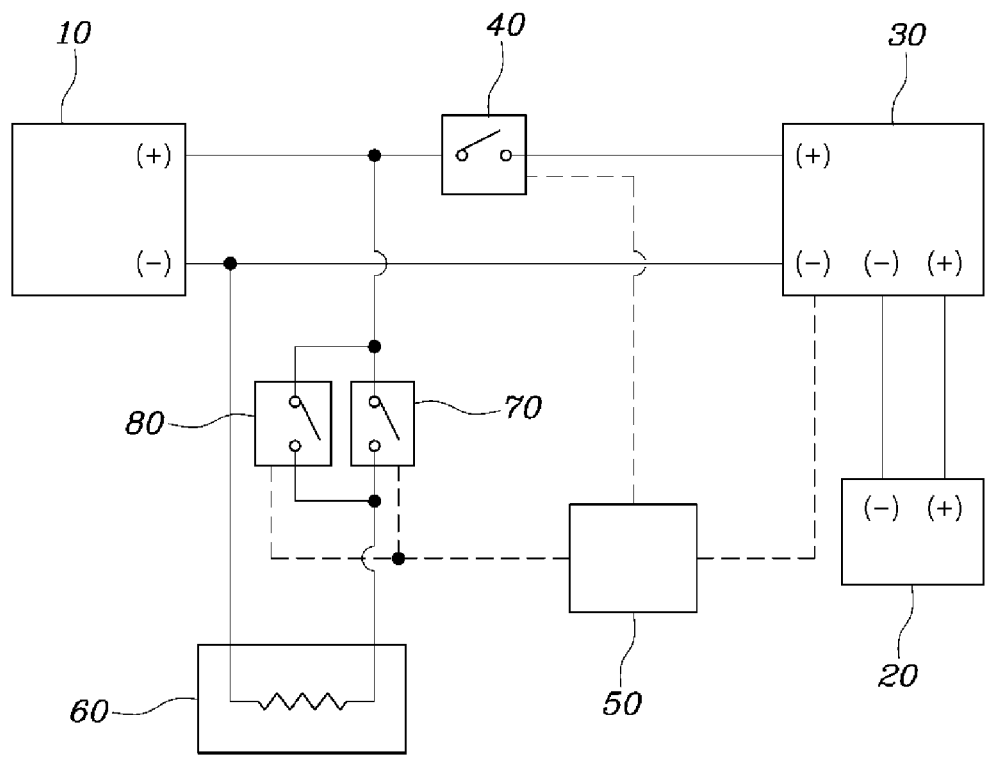
FIG. 1 is a configuration diagram of a shut down system of a fuel cell vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described with reference to the accompanying drawings.

As illustrated in FIG. 1, the shut down system of a fuel cell according to the exemplary embodiment of the present disclosure includes a fuel cell 10 configured to output a high voltage, a rechargeable high voltage battery 20, a bidirectional converter 30 arranged between an output terminal of the fuel cell 10 and the high voltage battery 20, a first relay 40 arranged between the fuel cell 10 and the bidirectional converter 30, a resistor part 60 configured to consume a voltage of the output terminal of the fuel cell 10, a second relay 70 arranged between the fuel cell 10 and the resistor part 60, and a controller 50.

A fuel cell system, e.g., as described above, is provided with a shut down system. However, in the existing shut down system, the fuel cell vehicle stalls, and at the same time, the first relay 40 corresponding to a main relay of a vehicle is also turned off. Therefore, in the existing case, the shut down system is configured so that the resistor part 60 separately provided consumes a voltage of an output terminal of the fuel cell 10 that outputs a high voltage before the starting of the fuel cell vehicle for safety of the vehicle. Due to the configuration of the shut down system as described above, the voltage of the output terminal is unnecessarily consumed, which adversely affects fuel efficiency of a vehicle.

Therefore, the present disclosure provides a shut down system of a fuel cell vehicle that may use the voltage of the output terminal of the fuel cell 10 as much as possible and reduce the voltage of the output terminal of the fuel cell 10 by appropriately controlling a turn on/turn off state of the first relay 40 and the second relay 70 depending on a state of the fuel cell vehicle and controlling a voltage of the bidirectional converter 30 even though the fuel cell vehicle stalls, thereby minimizing a deterioration of the fuel cell 10.

In particular, when the fuel cell vehicle stalls, the controller 50 controls the voltage of the bidirectional converter 30 to reduce the voltage of the output terminal of the fuel cell 10 and turn off the first relay 40 when a voltage value of the output terminal of the fuel cell 10 is below a preset voltage reference voltage.

As can be appreciated from FIG. 1, in the fuel cell vehicle system, the output voltage of the fuel cell 10 may be used for the charging of the high voltage battery 20 through the bidirectional converter 30. In particular, if the voltage of the bidirectional converter 30 is controlled to be lower than the voltage of the output terminal of the fuel cell 10, a current flows from the output terminal of the fuel cell 10 toward the bidirectional converter 30, and the current is converted by the bidirectional converter 30 and then transferred to the high voltage battery 20 to charge the high voltage battery 20. That is, the high voltage battery may be charged with the remaining voltage of the output terminal of the fuel cell 10, thereby improving the fuel efficiency of the vehicle. Here, the preset voltage reference value is a value used to determine whether the high voltage battery 20 may be charged and may vary depending on specifications of the fuel cell 10 or the high voltage battery 20.

However, a control method for reducing a voltage of an output terminal of a fuel cell 10 to charge the high voltage battery 20 may be different depending on a charging allowable current value of the high voltage battery 20. That is, if a maximum current value that may be used to charge the high voltage battery 20 is 20 A, a charging current that is generated due to the voltage control of the bidirectional converter 30 should not exceed 20 A.

Therefore, according to the exemplary embodiment of the present disclosure, a method for setting a limit to control the voltage of the bidirectional converter 30 reduces the voltage of the output terminal of the fuel cell 10 depending on a preset rate of change. In particular, the controller 50 appropriately controls the output voltage of the bidirectional converter 30 on the fuel cell 10 side to control the amount of current applied to the bidirectional converter 30 from the output terminal of the fuel cell 10, thereby controlling a descent rate of the voltage of the output terminal of the fuel cell 10. Here, the preset rate of change is a value associated with the charging allowable current value of the high voltage battery 20 as described above and may have various values depending on the specification of the high voltage battery 20 or the specification of the bidirectional converter 30.

The method for reducing a voltage of an output terminal of a fuel cell 10 by the voltage control of the first relay 40 and the bidirectional converter 30 may charge the high voltage battery 20 to improve the fuel efficiency of the fuel cell vehicle but is not so effective in rapidly reducing the voltage of the output terminal of the fuel cell 10 such as the descent rate of the voltage of the output terminal of the fuel cell 10 is limited as described above. Therefore, according to the exemplary embodiment of the present disclosure, when the fuel cell vehicle stalls, in order to rapidly reduce the voltage of the output terminal of the fuel cell 10 to prevent the fuel cell 10 from deteriorating as much as possible at an early stage of starting of the fuel cell 10 in which the high voltage is present, the controller 50 turns on the second relay 70 to allow the resistor part 60 to consume the voltage of the output terminal of the fuel cell 10.

That is, just after starting of the fuel cell 10, as illustrated in FIG. 1, the second relay 70 formed in parallel with the first relay 40 all are turned on to consume the voltage of the output terminal of the fuel cell 10 by the charging of the high voltage battery 20 and consume the voltage of the output terminal of the fuel cell 10 even by the resistor part 60, thereby reducing the voltage of the output terminal of the fuel cell 10 as rapidly as possible.

Therefore, according to the exemplary embodiment of the present disclosure, just after the fuel cell 10 stalls, the first relay 40 and the second relay 70 of the fuel cell system both are in a turn on state. However, as described above, when the voltage of the output terminal of the fuel cell 10 is below the preset voltage reference value, the high voltage battery 20 may not be charged. In this case, it is preferable to turn off the first relay 40.

In addition to the voltage of the output terminal of the fuel cell 10, various factors that may determine the turn off time of the first relay 40 are present. The exemplary embodiment of the present disclosure proposes the turn on duration of the second relay 70 and the chargeable power of the high voltage battery 20 as the determination factors.

As described above, the second relay 70 is a relay provided to allow the resistor part 60 to reduce the voltage of the output terminal of the fuel cell 10. Therefore, even though the second relay 70 is turned on only for several seconds, the voltage of the output terminal of the fuel cell 10 is reduced. In particular, as the size of the value of the resistor part 60 is reduced, the amount of flowing current is increased, and thus a decreasing speed of the voltage of the output terminal of the fuel cell 10 will be fast.

Therefore, according to the exemplary embodiment of the present disclosure, when the turn on time of the second relay 70 that suddenly reduces the voltage of the output terminal of the fuel cell 10, that is, the time lapsed after the second relay 70 is turned on exceeds the preset reference time, it is determined that the voltage of the output terminal of the fuel cell 10 does not correspond to the voltage that is sufficient to charge the high voltage battery 20, and thus the first relay 40 is turned off. Here, like the voltage reference value, the reference time may also have various values depending on the specifications of the fuel cell 10 and the high voltage battery 20.

In addition, when the chargeable power of the high voltage battery 20 is below the preset power reference value, it is also determined that the high voltage battery 20 may not be charged and thus the first relay 40 is turned off, in which the chargeable power may be derived based on the voltage of the output terminal of the fuel cell 10. Further, like the voltage reference value, the power reference value may also be various depending on the specifications of the fuel cell 10 and the high voltage battery 20.

Even though the first relay 40 is turned off by the foregoing method, the second relay 70 is still in the turn on state, and therefore the voltage of the output terminal of the fuel cell 10 is continuously consumed by the resistor part 40. Therefore, if the voltage of the output terminal of the fuel cell 10 is reduced to a level to prevent the fuel cell 10 from deteriorating, there is a need to turn off the second relay 70. Further, the voltage of the output terminal of the fuel cell 10 is maintained in a 0 V state even in a key off state of the vehicle by connecting a third relay 80 connected in parallel with the second relay 70 after the second relay 70 is turned off, thereby completely preventing the deterioration. For this purpose, the second relay 70 uses a normal open type relay to be maintained in the turn off state at ordinary time and turned on at the time of control and the third relay 80 uses a normal close type relay to be turned on at ordinary time and turned off at the time of control. By the selection of the relay type, the third relay 80 may be always turned on in the key off state of the vehicle to be connected with the resistor part 60.

Therefore, the exemplary embodiment of the present disclosure uses the control method, or the like to continuously reduce the voltage of the output terminal of the fuel cell 10 and then when the voltage of the output terminal of the fuel cell 10 is below the preset voltage minimum value, turns off the second relay 70 to maintain the voltage of the output terminal of the fuel cell 10 at an appropriate level. Here, the voltage minimum value may vary depending on the specifications of the fuel cell 10 and the high voltage battery 20.

Consequently, the second relay 70 is turned off and thus the voltage of the output terminal of the fuel cell 10 may be sufficiently reduced to prevent the fuel cell 10 from deteriorating, where the turn on of the first relay is maintained and the voltage of the bidirectional converter 30 is controlled to charge the high voltage battery 20, such that the voltage of the output terminal of the fuel cell 10 may be rapidly reduced and the fuel efficiency of the vehicle may be improved.

FIG. 2 is a flow chart illustrating a control sequence of the shut down system of the fuel cell vehicle. As illustrated in FIG. 2, according to the exemplary embodiment of the present disclosure, it is determined whether the vehicle in which the fuel cell 10 is mounted stalls (S10). Then, if it is determined that the vehicle stalls, the controller 50 performs a step (S20) of controlling the voltage of the bidirectional converter provided between the fuel cell 10 and the high voltage battery 20 to reduce the voltage of the output terminal of the fuel cell 10, and at the same time, the controller 50 performs a step (S30) of turning on the second relay 70 provided between the resistor part 60 provided to consume the voltage of the output terminal of the fuel cell 10 and the fuel cell 10.

Further, when as the first relay 40 and the second relay 70 are turned on, the voltage of the output terminal of the fuel cell 10 is reduced to be below the preset voltage reference value (S40), the controller 50 turns off the first relay 40 provided between the fuel cell and the bidirectional converter 30 (S50). While FIG. 2 illustrates only the comparing of the voltage of the output terminal with the voltage reference value (S40), instead of this, it may be determined whether the first relay 40 is turned off based on the turn on duration of the second relay 70 or the chargeable power of the high voltage battery 20, as described above.

After the turning off the first relay 40 (S50), the voltage of the output terminal of the fuel cell is compared with the preset voltage minimum value (S60) and when the voltage of the output terminal of the fuel cell is below the preset voltage minimum value, the controller 50 turns off the second relay 70 (S70) and the normal close type third relay 80 is turned on to be connected with the resistor part 60 (S80), such that the shut down sequence of the fuel cell vehicle will end. Therefore, the voltage of the fuel cell is maintained at 0 V even in the shut down or key off state of the vehicle to prevent the deterioration.

According to the exemplary embodiments of the present disclosure, it is possible to appropriately control the bidirectional converter and the relay configuring the power system of the fuel cell vehicle to rapidly and stably remove the voltage of the output terminal of the fuel cell when the fuel cell vehicle stalls and charge the high voltage battery with the energy wasted due to the consumption of the fuel cell voltage every time the fuel cell vehicle stalls to improve the fuel efficiency of the vehicle.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A shut down system of a fuel cell vehicle, comprising:
a fuel cell configured to output a high voltage;
a rechargeable high voltage battery;
a bidirectional converter arranged between an output terminal of the fuel cell and the high voltage battery;
a first relay arranged between the fuel cell and the bidirectional converter;
a controller configured to control a voltage of the bidirectional converter when the fuel cell vehicle stalls to reduce a voltage of the output terminal of the fuel cell and turn off the first relay when a voltage value of the output terminal of the fuel cell is below a preset voltage reference value;
a resistor part configured to consume the voltage of the output terminal of the fuel cell; and
a second relay arranged between the fuel cell and the resistor part,
wherein the controller turns on the second relay when the fuel cell vehicle stalls to allow the resistor part to consume the voltage of the output terminal of the fuel cell.

2. The shut down system of claim 1, wherein the controller turns off the second relay when the voltage value of the output terminal of the fuel cell is below a preset voltage minimum value.

3. The shut down system of claim 1, wherein the controller turns off the first relay when a preset reference time lapses after turning on the second relay.

4. The shut down system of claim 1, wherein the controller turns off the first relay when chargeable power of the high voltage battery based on the voltage of the output terminal of the fuel cell is below a preset power reference value.

5. The shut down system of claim 1, wherein the controller controls a voltage of the bidirectional converter so that the voltage of the output terminal of the fuel cell is reduced to a preset rate of change.

6. A shut down control method of a fuel cell vehicle, comprising:
controlling, by a controller, a voltage of a bidirectional converter provided between a fuel cell and a high voltage battery when the fuel cell vehicle stalls to reduce a voltage of an output terminal of the fuel cell;
turning off, by the controller, a first relay provided between the fuel cell and the bidirectional converter when the voltage of the output terminal of the fuel cell is below a preset voltage reference value; and
turning on, by the controller, a second relay provided between a resistor part provided to consume the voltage of the output terminal of the fuel cell and the fuel cell when the vehicle stalls.

7. The shut down control method of claim 6, further comprising:
turning off, by the controller, the second relay when the voltage of the output terminal of the fuel cell is below a preset voltage minimum value.

8. The shut down control method of claim 6, further comprising:
turning off, by the controller, the first relay when a preset reference time lapses after turning on the second relay.

9. The shut down control method of claim 6, further comprising:
turning off, by the controller, the first relay when chargeable power of the high voltage battery based on the voltage of the output terminal of the fuel cell is below a preset power reference value.

10. The shut down control method of claim 6, wherein the controller controls the voltage of the bidirectional converter so that the voltage of the output terminal of the fuel cell is reduced to a preset rate of change.

11. A non-transitory computer readable medium containing program instructions executed by a processor, the computer readable medium comprising:
  program instructions that control a voltage of a bidirectional converter provided between a fuel cell and a high voltage battery when a fuel cell vehicle stalls to reduce a voltage of an output terminal of the fuel cell;
  program instructions that turn off a first relay provided between the fuel cell and the bidirectional converter when the voltage of the output terminal of the fuel cell is below a preset voltage reference value; and
  program instructions that turn on a second relay provided between a resistor part provided to consume the voltage of the output terminal of the fuel cell and the fuel cell when the vehicle stalls.

12. The non-transitory computer readable medium of claim 11, further comprising:
  program instructions that turn off the second relay when the voltage of the output terminal of the fuel cell is below a preset voltage minimum value.

13. The non-transitory computer readable medium of claim 11, further comprising:
  program instructions that turn off the first relay when a preset reference time lapses after turning on the second relay.

14. The non-transitory computer readable medium of claim 11, further comprising:
  program instructions that turn off the first relay when chargeable power of the high voltage battery based on the voltage of the output terminal of the fuel cell is below a preset power reference value.

15. The non-transitory computer readable medium of claim 11, wherein the voltage of the bidirectional converter is controlled so that the voltage of the output terminal of the fuel cell is reduced to a preset rate of change.

\* \* \* \* \*